(12) United States Patent  
Buch et al.

(10) Patent No.: US 7,508,611 B2
(45) Date of Patent: Mar. 24, 2009

(54) DISK DRIVE CLOCK CIRCUIT THAT ADJUSTS CLOCK EDGE TIMING IN RESPONSE TO SERVO INFORMATION AND METHODS THEREOF

(75) Inventors: Bruce Buch, Westborough, MA (US); Pei-hui Zheng, Medfield, MA (US)

(73) Assignee: Seagate Technology, LLC, Scotts Valley, CA (US)

( * ) Notice: Subject to any disclaimer, the term of this patent is extended or adjusted under 35 U.S.C. 154(b) by 166 days.

(21) Appl. No.: 11/542,809

(22) Filed: Oct. 4, 2006

(65) Prior Publication Data

US 2007/0081266 A1   Apr. 12, 2007

Related U.S. Application Data

(60) Provisional application No. 60/725,036, filed on Oct. 7, 2005.

(51) Int. Cl.
*G11B 5/09* (2006.01)

(52) U.S. Cl. ............................. 360/51; 360/48; 360/53; 360/25

(58) Field of Classification Search .................. 360/31, 360/48, 51, 53, 77.12, 25, 46
See application file for complete search history.

(56) References Cited

U.S. PATENT DOCUMENTS

| | | | | |
|---|---|---|---|---|
| 5,208,556 A | * | 5/1993 | Wilson | 331/1 A |
| 5,539,723 A | * | 7/1996 | Hoshino et al. | 369/47.31 |
| 6,028,727 A | * | 2/2000 | Vishakhadatta et al. | 360/51 |
| 6,172,830 B1 | * | 1/2001 | Leonard | 360/51 |
| 6,181,505 B1 | * | 1/2001 | Sacks et al. | 360/77.08 |
| 6,278,567 B1 | * | 8/2001 | Nagasawa | 360/51 |
| 6,307,696 B1 | * | 10/2001 | Bishop et al. | 360/51 |
| 6,369,967 B1 | * | 4/2002 | Lam | 360/51 |
| 6,452,990 B1 | * | 9/2002 | Leis et al. | 375/361 |
| 6,738,205 B1 | * | 5/2004 | Moran et al. | 360/17 |
| 6,937,414 B2 | * | 8/2005 | Chickanosky | 360/51 |
| 7,203,014 B2 | * | 4/2007 | Kuroda et al. | 360/48 |
| 2003/0043710 A1 | * | 3/2003 | Shelton et al. | 369/44.34 |
| 2004/0047252 A1 | * | 3/2004 | Miyatake et al. | 369/47.12 |
| 2004/0201913 A1 | * | 10/2004 | Sutardja | 360/51 |
| 2006/0203371 A1 | * | 9/2006 | Abe et al. | 360/51 |

* cited by examiner

*Primary Examiner*—Hoa T Nguyen
*Assistant Examiner*—Dismery E Mercedes
(74) *Attorney, Agent, or Firm*—Allison Olenginski

(57) ABSTRACT

A disk drive clock circuit includes a servo clock generator and a disk locked frequency converter. The servo clock generator generates a servo clock signal in response to servo information read from a data storage disk in a disk drive. The disk locked frequency converter responds to the servo clock signal by generating a modified clock signal having a different frequency, and adjusts timing of an edge of the modified clock signal in response to a timing event identified from the servo information read from the disk. The disk locked frequency converter can include a divide-by-n counter that is configured to divide the frequency of the servo clock signal by a number n to generate the modified clock signal. The disk locked frequency converter can reset the divide-by-n counter to a defined value in response to the timing event. The modified clock signal can thereby be phase locked to the servo information on the disk.

18 Claims, 5 Drawing Sheets

US 7,508,611 B2

DISK DRIVE CLOCK CIRCUIT THAT ADJUSTS CLOCK EDGE TIMING IN RESPONSE TO SERVO INFORMATION AND METHODS THEREOF

RELATED APPLICATION

This application claims the benefit of and priority to U.S. Provisional Patent Application No. 60/725,036, filed Oct. 7, 2005, the disclosure of which is hereby incorporated herein by reference as if set forth in its entirety.

FIELD OF THE INVENTION

The present invention relates to disk based storage devices and, more particularly, to generating a clock signal that is adjusted based on rotation of a disk within a disk drive.

BACKGROUND OF THE INVENTION

A simplified diagrammatic representation of a disk drive, generally designated as 10, is illustrated in FIG. 1. The disk drive 10 includes a data storage disk 12 that is rotated by a spindle motor 14. The spindle motor 14 is mounted to a base plate 16. An actuator arm assembly 18 is also mounted to the base plate 16.

The actuator arm assembly 18 includes a read/write head 20 mounted to a flexure arm 22 which is attached to an actuator arm 24 that can rotate about a pivot bearing assembly 26. The actuator arm assembly 18 also includes a voice coil motor (VCM) 28 which moves the head 20 relative to tracks defined on the disk 12. The spindle motor 14, VCM 28, and head 20 are coupled to a number of electronic circuits 30 mounted to a printed circuit board 32. Although a single disk 12 is illustrated in FIG. 1, the disk drive 10 may instead include a plurality of disks with a head adjacent to each disk storage surface to read/write therefrom.

FIG. 2 is an exemplary top view of the disk 12. Data is stored on the disk 12 within a number of concentric tracks 40 (or cylinders). Each track is divided into a plurality of radially extending sectors 42 of the disk 12. Each sector 42 is further divided into a servo sector 44 and a data sector 46. Information in the servo sectors 44 is used to, among other things, accurately position the head 20 so that host data can be properly written onto and read from the data sectors 46.

FIG. 3 illustrates exemplary servo information 73 within servo information that may be stored in each of the servo sectors 44. The servo information 73 can include a DC erase field 731, a preamble field 732, a servo address mark (SAM) field 733, a track number field indicated by its least significant bits (LSBs) 734, a spoke number field 735, an entire track number field 736 which is recorded in at least one of the servo sectors 44, and a servo burst field 737 of circumferentially staggered radially offset servo bursts (e.g., A, B, C, D servo bursts).

A read write channel circuit in the electronic circuits 30 may use the DC erase field 731 as an indication of the onset of one of the servo sectors 44. The channel circuit may use the preamble field 732 to establish a gain and disk-locked timing relationship for sampling the analog signal that is generated when reading from the disk 12. More particularly, the channel circuit may generate a servo clock signal based on the preamble field 732. The channel circuit may count cycles of the servo clock between adjacent SAMs 733 and may adjust the frequency of the servo clock signal in an attempt to provide a substantially constant number of cycles between adjacent SAMs 733. The channel circuit may divide the servo clock signal by a counter to generate a lower frequency clock signal. The lower frequency clock signal may be used to estimate the starting and stopping locations of the data sectors 46. Because of uncertainty in the estimated locations of the fields of the servo sectors 44 and/or the data sectors 46, the length of the DC erase field 731, the preamble field 732, other fields and/or gaps may need to be increased. As can be appreciated, such lengthening of the fields/gaps can decrease the storage capacity and/or the read/write throughput of the disk drive 10.

SUMMARY OF EMBODIMENTS OF THE INVENTION

In some embodiments of the present invention, a disk drive clock circuit includes a servo clock generator and a disk locked frequency converter. The servo clock generator generates a servo clock signal in response to servo information read from a data storage disk in a disk drive. The disk locked frequency converter responds to the servo clock signal by generating a modified clock signal having a different frequency, and adjusts timing of an edge of the modified clock signal in response to a timing event identified from the servo information read from the disk. The modified clock signal may thereby be phase locked to the servo information on the disk.

In some further embodiments of the present invention, the disk drive clock circuit varies the frequency of the servo clock signal to cause a substantially constant number of cycles of the servo clock signal to occur between sequential servo address marks in the servo information. The modified clock signal may thereby be both phase locked and frequency locked to the servo information on the disk, which may allow a servo controller to more accurately estimate the start/stop locations of servo sector fields and/or data sectors.

Some other embodiments of the present invention are directed to related methods of generating a clock signal in a disk drive.

DETAILED DESCRIPTION OF EMBODIMENTS OF THE INVENTION

Figure 1:
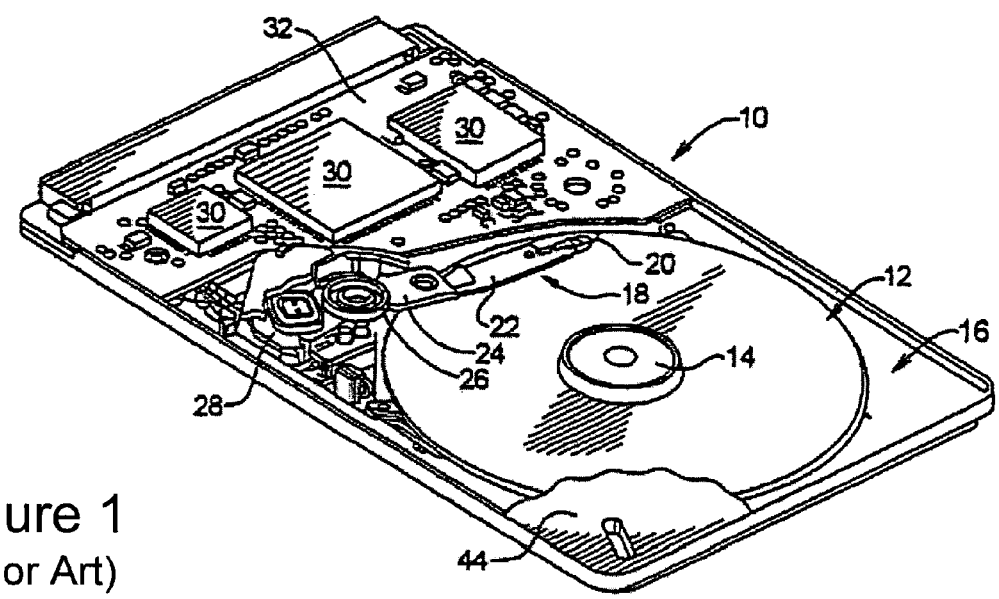
FIG. 1 is a perspective view of a conventional disk drive.
Figure 2:
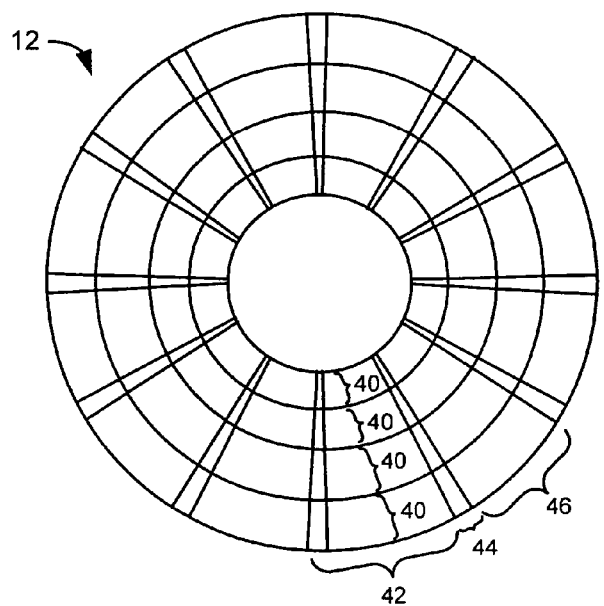
FIG. 2 is a top view of a conventional disk and illustrates tracks and sectors.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity.

Some embodiments of the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system.

The present invention is described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 4:
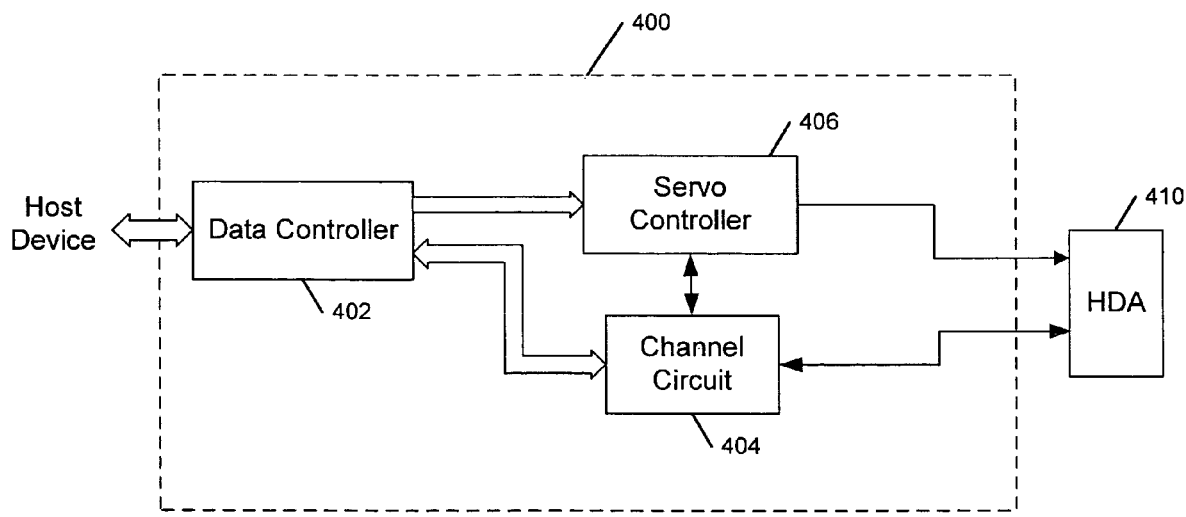
FIG. 4 is a block diagram of a disk drive and illustrates electronic circuits of a disk drive that include a read write channel, a data controller, and a servo controller in accordance with some embodiments of the present invention.

FIG. 4 is a block diagram of electronic circuits 400 of a disk drive, which may be suitable for inclusion within the circuits 30 of disk drive 10 of FIG. 1. The electronic circuits 400 include a data controller 402, a read write channel circuit ("channel circuit") 404, and a servo controller 406. Although a separate channel circuit 404 and controllers 402 and 406 have been illustrated for purposes of illustration and discussion only, it is to be understood that their functionality may be consolidated in fewer components or distributed among more and/or other components. The electronic circuits 400 respond to host read/write commands to control the head disk assembly (HDA) 410 to seek the head 20 to a track address and Logical Block Addresses (LBAs) identified by the host read/write command and to read/write data therefrom. The HDA 410 can include the actuator arm assembly 18, the disk(s) 12, the VCM 28, and the spindle motor 14.

The channel circuit 404 can convert data between the digital form used by the data controller 402 and the analog form conducted through the head 20 in the HDA 410. The channel circuit 404 provides servo positional information read from the HDA 410 to the servo controller 406. The servo positional information can be used to detect the location of the head 20 in relation to LBAs on the disk 12. The servo controller 406 can use LBAs from the data controller 402 and the servo positional information to seek the head 20 to an addressed track and block on the disk 12, and to maintain the head 20 aligned with the track while data is written/read on the disk 12.

The channel circuit 404 is configured to generate a servo clock signal in response to the head 20 reading servo information from the disk 12. It can use the servo clock signal to generate a modified clock signal having a different frequency, such as by dividing the servo clock signal using the output of a counter. The channel circuit 404 can count a number of cycles of the servo clock between adjacent SAMs 733 and adjust the frequency of the modified clock signal in an attempt to provide a substantially constant number of clock cycles between adjacent SAMs 733. In accordance with some embodiments of the present invention, the channel circuit 404 adjusts timing of an edge of the modified clock signal in response to a timing event that it identifies in the servo information. The modified clock signal may thereby be frequency locked and phase locked to servo information as the disk 12 rotates. The servo controller 406 can use the modified clock frequency to estimate the starting and stopping locations of the fields of the servo information 73 and/or the data sectors 46. Because the modified clock signal can be frequency and phase locked to the disk 12, the servo controller 406 may more accurately estimate the locations of the fields of the servo sectors 44 and/or the data sectors 46 so that shorter servo fields/gaps may be used and/or so that increased storage capacity and/or read/write data throughput of the disk drive may be obtained.

Figure 5:
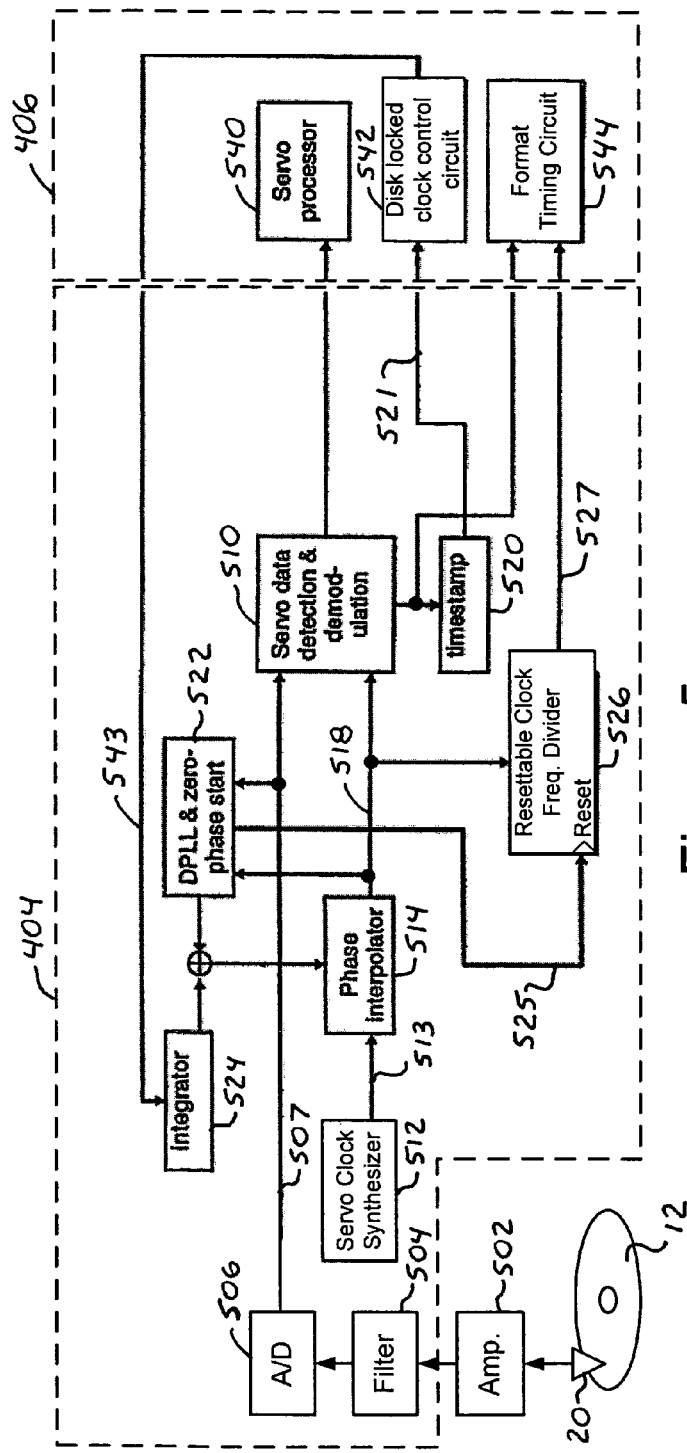
FIG. 5 is a block diagram of methods and circuits of the read write channel and the servo controller according to some embodiments of the present invention.

FIG. 5 illustrates an exemplary embodiment of the channel circuit 404 and servo controller 406. The channel circuit 404 generates a clock signal that is phase locked and frequency locked to rotation of the disk 12 according to some embodiments of the present invention. Servo information is read from the disk 12 by the head 20 to generate a servo signal. The servo signal is amplified by an amplifier 502, filtered by a filter 504, and converted to a digital servo information signal 507 by an analog-to-digital converter ("A/D") 506 and which is provided to the channel circuit 404.

The channel circuit 404 can include a servo data detection and demodulation circuit 510, a servo clock synthesizer 512, phase interpolator 514, time stamp circuit 520, a digital PLL (DPLL) and zero-phase start circuit 522, an integrator 524, and a resettable clock frequency divider 526. The servo controller 406 can include a servo processor 540, a disk locked clock control circuit 542, and a format timing circuit 544.

Figure 3:
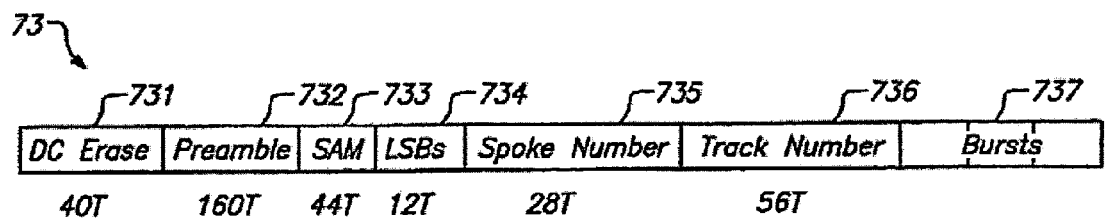
FIG. 3 is a block diagram of conventional servo information fields in a servo sector.

The servo clock synthesizer 512 generates a fixed frequency servo clock 513 with a frequency matching the nominal bit frequency of the servo format. When reading a servo field, the DPLL and zero-phase start circuit 522 responds to the digitized servo read signal 507 and outputs phase control to the servo interpolator 514, so that the clock signal 518 is phase and frequency locked to the servo field phase and frequency. When the channel circuit 404 is done reading the servo field, the DPLL and zero-phase start circuit 522 freezes its output to the phase interpolator 514, at which point the only variable input to the phase interpolator 514 is from the integrator 524. The integrator 524 output is can vary over all times, e.g., during and outside of the servo field. The integrator 524 output is generally a slowly advancing or retarding phase ramp that slightly raises or lowers the frequency of the clock signal 518 relative to the fixed frequency clock 513 input to the interpolator 514. The servo data detection and demodulation circuit 510, the time stamp circuit 520, and the disk locked clock control circuit 542 cooperatively function in a feedback loop to adjust the frequency of the clock signal 518 so as to generate a frequency-to-disk-rotation locked clock signal ("frequency-disk locked clock") 518 that has a substantially constant number of clock periods between adjacent SAM fields 733 (FIG. 3) of the servo information.

The servo data detection and demodulation circuit 510 detects and demodulates at least some of the servo fields represented by the digital servo information signal 507, such as the preamble field 732, SAM field 733, LSBs field 734, spoke number field 735, track number field 736, and/or servo bursts field 737. The time stamp circuit 520 counts cycles in the frequency-disk locked clock 518 and outputs a count snapshot 521 to the disk locked clock control circuit 542 in response to detection of the SAM field 733. The disk locked clock control circuit 542 compares two successive count snapshots 521, corresponding to two successive SAM fields 733, and generates a frequency offset signal 543 in response to the comparison. Thus, for example, the generated frequency offset signal 543 can increase the frequency of the frequency-locked clock 516 when a present count snapshot 521 is less than a previous count snapshot 521, and can decrease the frequency of the frequency-locked clock 516 when the present count snapshot 521 is greater than the previous count snapshot 521. The frequency offset signal 543 is integrated by the integrator 524 and combined with an output of the DPLL and zero-phase start circuit 522 to generate the phase signal 516.

Figure 6:
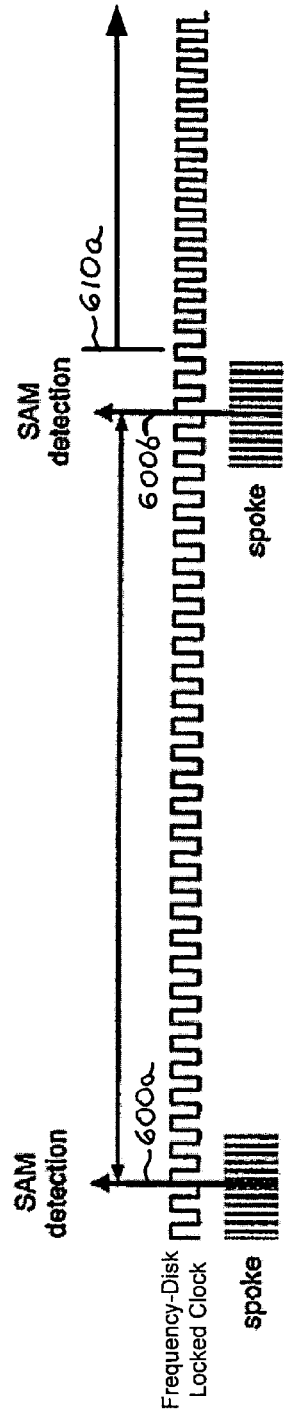
FIG. 6 is a graph that illustrates a clock signal that has a frequency which is adjusted in response to variation in the number of servo clock signal cycles between SAMs.

FIG. 6 is an exemplary graph of the frequency-disk locked clock 518. The clock frequency is constant between a detected pair of adjacent SAMs 600a-b. The clock frequency is adjusted at time 610 to a higher frequency in response to a determination that the number of clock cycles between SAMs 600a-b is less than a target value, and so that the number of clock cycles between SAM 600b and a subsequent SAM will be closer to the target value.

The resettable clock frequency divider 526 responds to the frequency-disk locked clock 518 by generating the modified clock signal 527 at a different frequency than the frequency-disk locked clock 518. The resettable clock frequency divider 526 may used a divide-by-n counter to generate the modified clock signal 527 from the frequency-disk locked clock 518.

Figure 7:
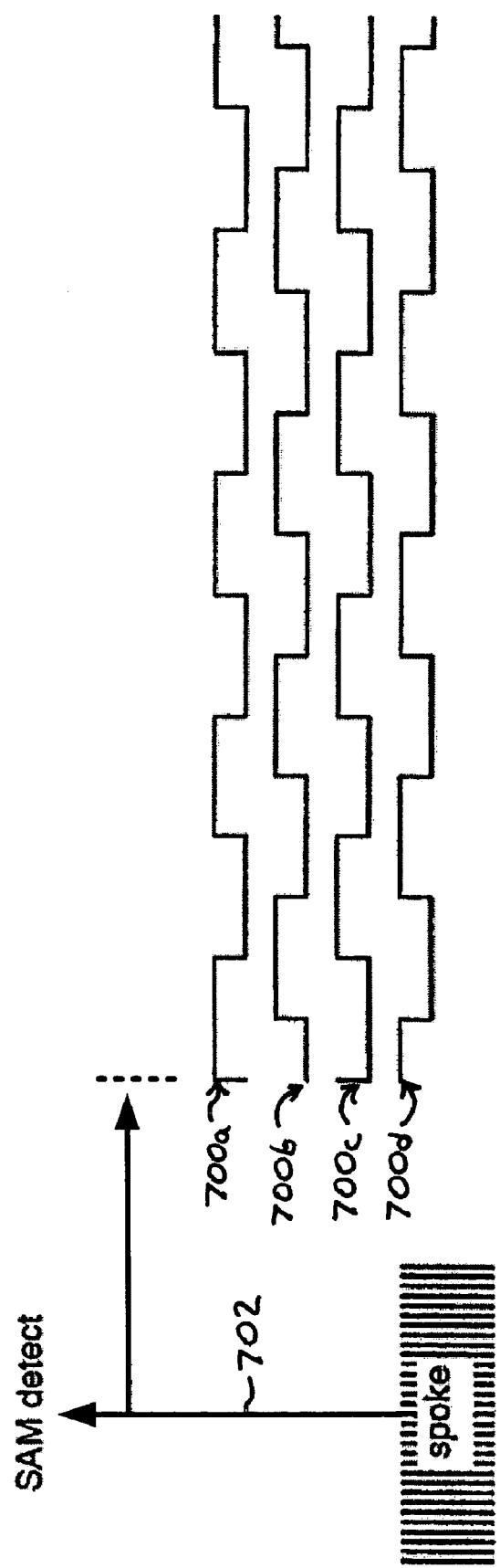
FIG. 7 is a graph that illustrates four possible relative phases of edges of the modified clock signal upon detection of a SAM.

FIG. 7 is a graph that illustrates four possible edge phases 700a-d of the output of a divide-by-4 counter that is responding to the frequency-disk locked clock 518 at the time of detecting of a SAM field 702. Accordingly, if the modified clock signal 527 were generated as the output of this divide-by-4 counter, the edges of the modified clock signal 527 would exhibit phase jitter from one SAM field 702 to another. Such phase jitter in the modified clock signal 527 may contribute to the uncertainty that the servo controller 406 would have as to the starting and stopping locations of the fields of the servo information 73 and/or the data sectors 46, and may thereby necessitate the use of longer servo fields and/or gaps.

However, in accordance with some embodiments of the present invention, the clock frequency divider 526 phase locks the modified clock signal 527 to the rotating disk 12. More particularly, the clock frequency divider 526 adjusts the timing of edges of the modified clock signal 527 in response to timing events that are identified in the servo information read from the disk 12. The clock frequency divider 526 can include a divide-by-n counter, and can divide the frequency-disk locked clock 518 by the output of the counter to generate the modified clock signal 527. The value n of the divide-by-n counter may be an integer, such as 4. The clock frequency divider 526 is reset in response to the detection of a timing event in the servo information. For example, the DPLL and zero phase start circuit 522 can generate a chunk sync signal 525 in response to it identifying the occurrence of a cycle of the signal that is represented by the preamble 732 of the servo information. The clock frequency divider 526 can reset the divide-by-n counter to a defined value, such as 0, in response to the chunk sync signal 525.

Figure 8:
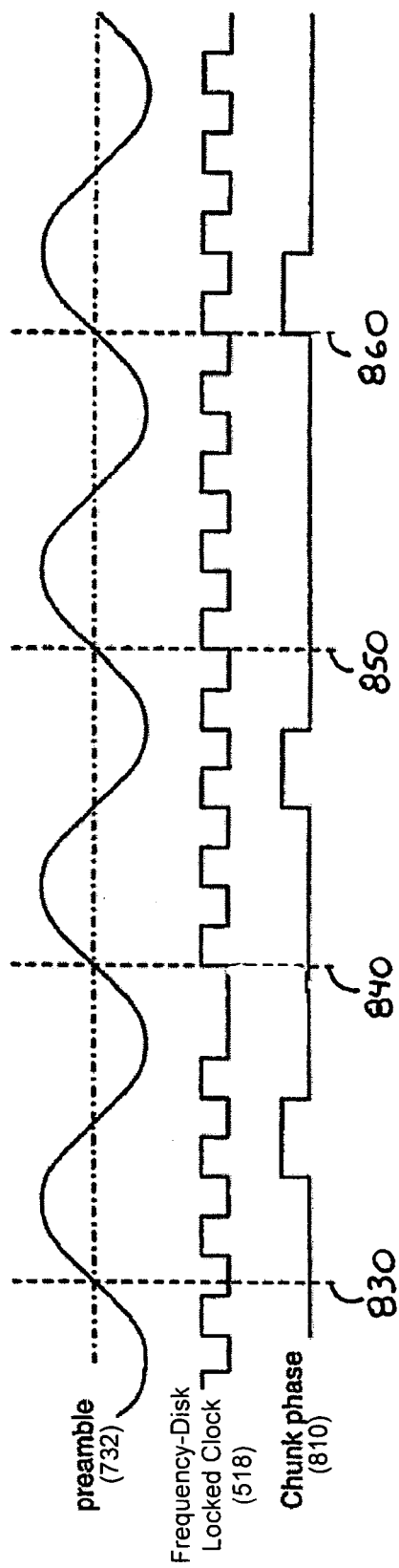
FIG. 8 illustrates graphs of the full rate servo clock signal generated from servo information, a sinusoidal wave that is represented by a preamble of the servo information, and a chunk synchronization signal that is generated in response to detection of a cycle of the preamble.

Exemplary operations of the DPLL and zero phase start circuit 522 and clock frequency divider 526 that phase align the modified clock signal 527 to timing events on the disk 12 are explained with regard to FIG. 8. FIG. 8 illustrates graphs of a sinusoidal waveform that represents the bit pattern of the preamble 732 field of the servo information, the frequency-disk locked clock 518 generated from phase interpolator 514, and a chunk phase signal 810. At time 830, the frequency-disk locked clock 518 has a random phase relationship with respect to the preamble 732. The DPLL and zero phase start circuit 522 detects a positive zero-crossing of the preamble 732 at time 840 and outputs a signal, which is combined with the output of integrator 524 to generate the phase signal 516, to cause the phase interpolator 514 to phase align the frequency-disk locked clock 518 with the phase of the preamble 732. At time 850, another positive zero-crossing of the preamble 732 occurs while the chunk phase is still not aligned to the preamble 732. At time 860, the frequency-disk locked clock 518 detects a cycle of the preamble 732 and responds by outputting the chunk sync signal 525 to reset the clock frequency divider 526.

Figure 9:
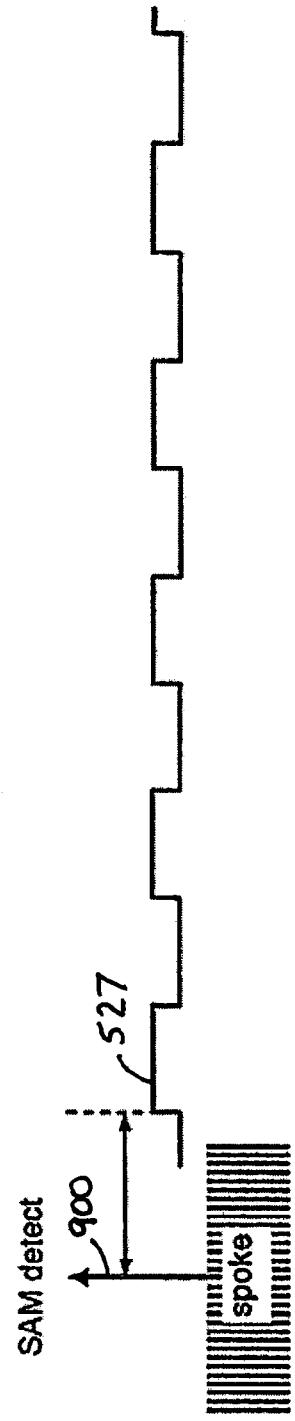
FIG. 9 is a graph that illustrates a leading edge of the modified clock signal that is adjusted in response to the chunk synchronization signal according to some embodiments of the present invention.

By resetting the clock frequency divider 526 and, more particularly, by resetting a counter of the clock frequency divider 526 to a defined value (e.g., 0), a leading edge of the modified clock signal 527 generated therefrom is aligned with the positive zero crossing of the preamble 732. Because the preamble 732 has a fixed phase relationship relative to the SAM 733, alignment of the leading edge of the modified clock signal 527 causes the leading edge to also have a fixed phase relationship relative to the SAM 733. For example, as shown in FIG. 9, a leading edge of the modified clock signal 527 can be aligned with a detected SAM 900.

The format timing circuit 544 counts cycles of the modified clock signal 527 to determine the start and stop locations of some of the fields of the servo information 73 and/or the data sectors 46 in the demodulated signal that is output by the servo data detection and demodulation circuit 510. Because the modified clock signal 527 is frequency and phase locked to the preamble 732, the format timing circuit 544 may more accurately determine the start and stop locations of some of the fields of the servo information 73 and/or the data sectors 46.

Although an exemplary embodiment of the channel circuit 404 has been shown in FIG. 5 in which the clock frequency divider 526 is reset in response to the chunk sync signal 525 and which, in turn, is generated based on identifying a positive zero-crossing of the preamble 732, it is to be understood that another timing event which is represented by the servo information may be detected and used to reset the clock frequency divider 526. For example, the clock frequency divider 526 may be reset in response to detection of another timing event associated with the preamble 732, the SAM 733, and/or another one of the fields of the servo information 73.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive clock circuit comprising:
  a servo clock generator that is configured to generate a servo clock signal in response to servo information read from a data storage disk in a disk drive;
  a disk locked frequency converter that is configured to respond to the servo clock signal by generating a modified clock signal having a different frequency, and to adjust timing of an edge of the modified clock signal in response to a timing event identified from the servo information read from the disk; and
  a chunk synchronization circuit that is configured to generate a chunk sync signal in response to identifying occurrence of a cycle of a signal that is represented by a portion of the servo information, and wherein the disk locked frequency converter is configured to respond to the chunk sync signal by adjusting timing of an edge of the modified clock signal.

2. The disk drive clock circuit of claim 1, wherein the disk locked frequency converter is configured to generate the modified clock signal as a lower frequency representation of the servo clock signal.

3. The disk drive clock circuit of claim 2, wherein:
the disk locked frequency converter comprises a divided-by-n counter that is configured to divide the frequency of the servo clock signal by a number n to generate the modified clock signal; and
the disk locked frequency converter is configured to reset the divide-by-n counter to a defined value in response to the timing event.

4. The disk drive clock circuit of claim 3, wherein:
the disk locked frequency converter is configured to reset the divide-by-n counter to zero in response to the timing event.

5. The disk drive clock circuit of claim 1, wherein:
the chunk synchronization circuit is configured to generate the chunk sync signal in response to identifying occurrence of at least two sequential zero crossing points in the signal represented by a portion of the servo information; and
the disk locked frequency converter is configured to respond to the chunk sync signal by resetting the timing of a leading edge of the modified clock signal.

6. The disk drive clock circuit of claim 5, wherein the chunk synchronization circuit is configured to generate the chunk sync signal in response to identifying occurrence of at least two sequential zero crossing points in a preamble field of the servo information.

7. The disk drive clock circuit of claim 1, further comprising a servo address mark detection circuit that is configured to detect occurrence of servo address marks in the servo information, and wherein the disk locked frequency converter is configured to respond to a detected occurrence of the servo address mark by adjusting timing of an edge of the modified clock signal.

8. The disk drive clock circuit of claim 1, wherein the disk locked frequency converter is configured to adjust timing of phase of the modified clock signal in response to the timing event identified from the servo information.

9. The disk drive clock circuit of claim 1, wherein the disk locked frequency converter is configured to phase align the modified clock signal to the timing event.

10. The disk drive clock circuit of claim 1, further comprising a format timing circuit that is configured to determine the location of at least some fields of the servo information in response to the modified clock signal.

11. The disk drive clock circuit of claim 1, further comprising:
a servo address mark detection circuit that is configured to detect occurrence of servo address marks in the servo information; and
a disk locked clock control circuit that is configured to vary the frequency of the servo clock signal to provide a substantially constant number of cycles of the servo clock signal to occur between sequential servo address marks in the servo information.

12. A disk drive clock circuit comprising:
a servo clock generator that is configured to generate a servo clock signal in response to servo information read from a data storage disk in a disk drive;
a disk locked frequency converter that is configured to respond to the servo clock signal by generating a modified clock signal having a different frequency, and to adjust timing of an edge of the modified clock signal in response to a timing event identified from the servo information read from the disk:
a servo address mark detection circuit that is configured to detect occurrence of servo address marks in the servo information;
a disk locked clock control circuit that is configured to vary the frequency of the servo clock signal to provide a substantially constant number of cycles of the servo clock signal to occur between sequential servo address marks in the servo information; and
a chunk synchronization circuit that is configured to generate a chunk sync signal in response to identifying occurrence of at least one zero crossing point in a preamble field of the servo information, and wherein the disk locked frequency converter is configured to respond to the chunk sync signal by adjusting timing of an edge of the modified clock signal.

13. The disk drive clock circuit of claim 12, further comprising a format timing circuit that it configured to determine the location of at least some fields of the servo information in response to the modified clock signal.

14. A method of generating a clock signal in a disk drive, the method comprising:
generating a servo clock signal in response to servo information read from a data storage disk in the disk drive;
generating a modified clock signal in response to the servo clock signal and having a different frequency than the servo clock signal, and to adjust timing of an edge of the modified clock signal in response to a timing event identified from the servo information read from the disk;
identifying occurrence of a cycle of a signal that is represented by a portion of the servo information as the timing event; and
adjusting timing of an edge of the modified clock signal.

15. The method of claim 14, wherein generating a modified clock signal comprises:
down-converting the frequency of the servo clock signal using a divide-by-n counter to generate the modified clock signal; and
resetting the divide-by-n counter to a defined value in response to the timing event.

16. The method of claim 15, wherein occurrence of at least one zero crossing point in a preamble field of the servo information is identified as the timing event, and the divide-by-n counter is reset to the defined value in response to the identified occurrence of the at least one zero crossing point in the preamble field.

17. The method of claim 14, further comprising:
detecting occurrence of servo address marks in the servo information; and
varying the frequency of the servo clock signal to provide a substantially constant number of cycles of the servo clock signal between sequential servo address marks in the servo information.

18. The method of claim 17, further comprising:
determining the location of at least some fields of the servo information in response to the modified clock signal.

* * * * *